Aug. 23, 1927.
J. D. HAY
1,639,848
ENGINE
Filed Oct. 28, 1925
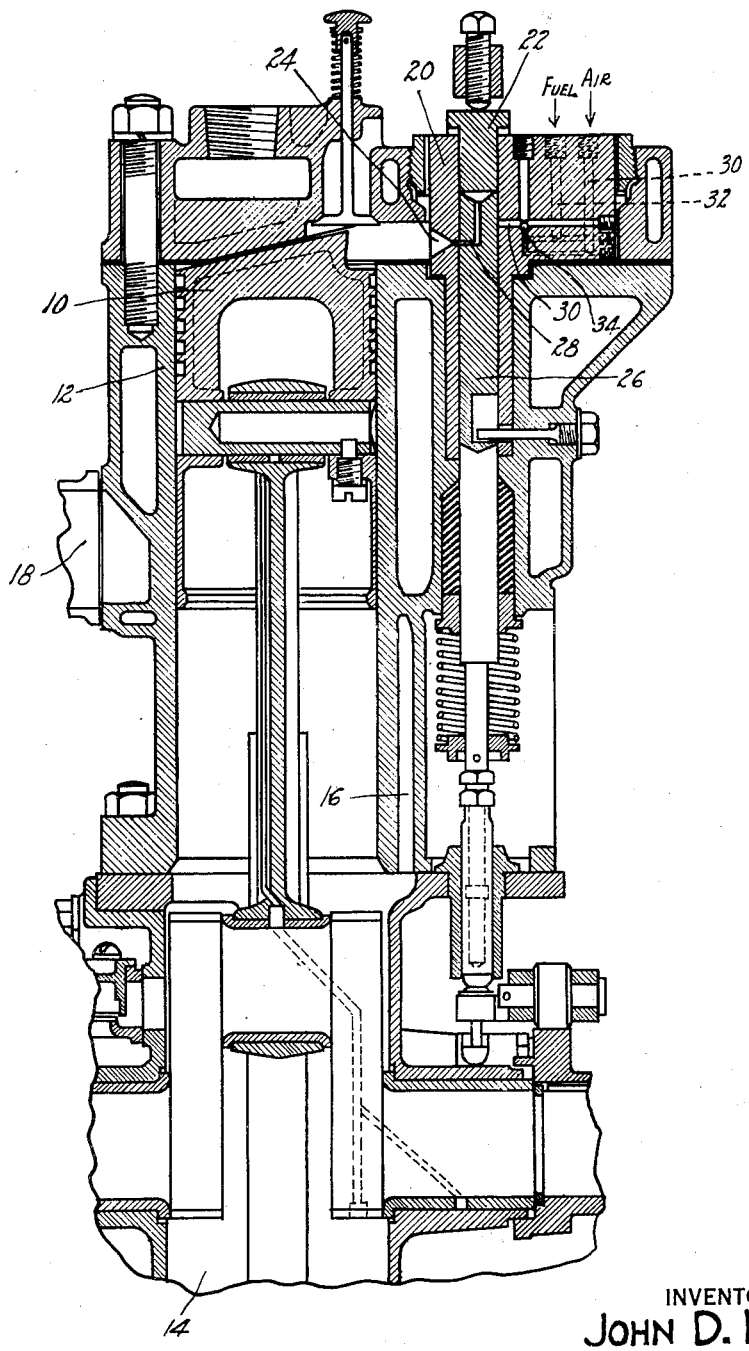
INVENTOR
JOHN D. HAY
BY
M. W. McConkey
ATTORNEY Patented Aug. 23, 1927.

1,639,848

UNITED STATES PATENT OFFICE.

JOHN D. HAY, OF SOUTH BEND, INDIANA, ASSIGNOR TO GERNANDT MOTOR CORPORATION, OF CHICAGO, ILLINOIS, A CORPORATION OF ILLINOIS.

ENGINE.

Application filed October 28, 1925. Serial No. 65,293.

This invention relates to engines and is illustrated as embodied in an engine of the injection type. An object of the invention is to provide improved means for feeding adequately-prepared fuel in successive charges to the engine.

One feature of the invention relates to vaporizing the successive charges of fuel prior to injection, by compressing them with air, preferably to such a degree that part of the fuel burns in the air and the remainder of the fuel is vaporized in the resulting products of combustion partly by the heat of compression and partly by the heat of combustion.

Other features of the invention relate to a novel arrangement of the air and fuel intake passages of the fuel-feeding auxiliary cylinder, and to other novel combinations of parts and desirable particular constructions shown in the accompanying drawing, in which:

The figure is a vertical section through an engine embodying the invention.

The invention is shown in this drawing embodied in a two-cycle engine of the injection type, including a power cylinder 12 and a power piston 10. Piston 10 is arranged to compress successive charges of air (unmixed with fuel) in the crankcase 14, whence at the lower end of each stroke of the piston the air passes by a passage 16 to the power cylinder through an intake part (not shown) uncovered at that time by the piston. At the same time an exhaust port is uncovered, and the exhaust gases pass out through an exhaust conduit 18.

At one side of the power cylinder 12 is a separate fitting 20, in which is formed an auxiliary fuel-feeding cylinder closed at its upper end by a plug 22, and communicating with the upper end of the power cylinder through one or more ports 24. In this auxiliary cylinder is arranged an auxiliary plunger or piston 26 having a passage 28 registering with port 24 when the piston is at the upper end of its stroke.

At one side of the auxiliary cylinder there opens an intake passage 30 uncovered by the auxiliary piston at or near the lower end of its stroke, which passage has a vertical portion into which opens a fuel passage 32. At the upper end of the vertical portion of passage 30, i. e. between passage 32 and the auxiliary cylinder, there is preferably an inwardly-opening check valve 34.

On its downward stroke, piston 26 creates a considerable vacuum in the auxiliary cylinder, and when it uncovers the end of passage 30 the air rushes past passage 32, taking up a charge of fuel, and past the check valve 34, filling the auxiliary cylinder. The air is preferably drawn from some suitable air cleaning device (not shown), but is not necessarily heated. If piston 26 is allowed a sufficient downward travel, it will next uncover passage 24, just before piston 10 reaches the bottom of its power stroke, and hot exhaust gases under considerable pressure will be forced into the auxiliary cylinder. I prefer, however, to limit the stroke of the piston 26 to prevent this happening, utilizing only the air and fuel in forming the fuel mixture.

On the upward stroke of piston 26, the mixture of air and fuel is so highly compressed as to ignite and burn part of the fuel, the remainder of the fuel being vaporized in the resulting products of combustion partly by the heat of combustion and partly by the heat of compression. At the upper end of the stroke, the intensely hot vaporized fuel mixture is injected by its higher pressure through passage 28 and port 24 into the highly compressed and heated air in the power cylinder 12, combustion immediately taking place since both the air and the fuel are above the ignition point of the fuel.

While one form of engine has been described in detail, it is not my intention to limit the scope of the invention to that particular engine, or otherwise than by the terms of the appended claims.

I claim:

1. A fitting to be inserted in the cylinder head of an engine, and formed with a vertical cylinder for a fuel-feeding plunger, a horzontal passage opening into the side of said cylinder, an air passage opening into the bottom of said horizontal passage and thence horizontally and thence upwardly to the top of the fitting, and a fuel passage leading from the top of the fitting and opening into the air pasage just below said horizontal passage.

2. A fitting to be inserted in the cylinder head of an engine, and formed with a vertical cylinder for a fuel-feeding plunger, a horizontal passage opening into the side of said cylinder, an air passage opening into the bottom of said horizontal passage and thence horizontally and thence upwardly to the top of the fitting, and a fuel passage leading from the top of the fitting and opening into the air passage just below said horizontal passage, together with a check valve at the point the air passage opens into the horizontal passage.

In testimony whereof, I have hereunto signed my name.

JOHN D. HAY.